Nov. 20, 1934.     W. L. MONRO     1,981,703
LAMINATED GLASS
Filed Dec. 18, 1933

INVENTOR

Patented Nov. 20, 1934

1,981,703

UNITED STATES PATENT OFFICE 1,981,703

LAMINATED GLASS

William L. Monro, Pittsburgh, Pa.

Application December 18, 1933, Serial No. 702,877

6 Claims. (Cl. 49—92)

This invention relates to the manufacture of glass, and more particularly laminated glass, and provides a new and useful product which is superior in many respects to those known at the present time.

The broad idea of a laminated glass comprising two glass sheets cemented together with a layer of non-brittle strengthening material therebetween is old and well known. Various different processes have been proposed for the formation of such a laminated glass, and various different strengthening materials to be interposed between the glass sheets have been used. The present invention does not relate to the strengthening material to be interposed between the glass sheets nor to the process whereby a satisfactory union is obtained between the glass sheets and the strengthening material. It is not limited to the use of any particular strengthening material or to any particular process of obtaining a union between the component parts of the composite product.

The present invention is concerned with the combination of glass sheets of certain characteristics whereby a quality product may be obtained at low cost and with certain structural advantages not heretofore obtainable.

The present requirements for laminated glass are high, and consequently it has heretofore been the general practice to use nothing but plate glass in forming the sandwich. This is particularly true where the composite product is to be used in automobile windshields and side windows, airplane windows and windows of various other types of vehicles. Plate glass is produced by a rolling operation so that the faces thereof are roughened or marred and require grinding or polishing. In order to obtain a satisfactory plate glass, it is necessary to grind and polish both faces thereof. The resulting glass, by reason of the grinding and polishing, is given a flat true surface. Such sheets are usually substantially optically true and do not present a wavy appearance with resultant distortion as does the ordinary drawn fire polished glass. However, the cost of manufacturing plate glass is considerably greater than the cost of drawn glass, and it is, therefore, desirable to use drawn glass having fire polished surfaces wherever possible instead of plate glass. In addition to the cost factor, it is desirable to use drawn glass sheets wherever possible for additional reasons to be pointed out hereinafter.

Drawn glass is produced by a drawing operation either in the form of cylinders which are flattened and cut up, or are in the form of a continuous sheet. This form of glass has a highly desirable finish or polish so that it requires no mechanical surfacing whatever as does plate glass. Drawn glass sheets, however, have wavy surfaces, and consequently tend to distort objects viewed therethrough at an angle. It has heretofore been proposed to unite two sheets of ordinary drawn glass with a layer of strengthening material interposed between them, but such a product has not been deemed satisfactory, in view of the fact that considerable distortion is caused by the wavy or undulatory surfaces of the glass sheets. Consequently, ground and polished glass sheets have been principally used in the manufacture of commercial laminated glass.

I have found that by combining one sheet of ground and polished glass with a sheet of drawn glass having one face thereof fire polished and the other face thereof ground and polished, a laminated product can be secured which is practically indistinguishable from glass formed of two ground and polished sheets so far as distortion is concerned. The wave-like appearance or irregularities of the one face of the drawn glass sheet are not apparent when the same is laminated with a sheet of ground and polished glass. This is particularly true where the fire polished undulatory surface of the sheet of drawn glass is turned inwardly and the face having the irregularities removed therefrom, as by grinding and polishing, turned outwardly. I have found that a product of this character has a quality equal for all practical purposes to the more expensive types of laminated glass formed of ground and polished plate glass sheets despite the fact that one face of the sheet of drawn glass has all of its characteristic wave. The product which I provide eliminates the wavy appearance obtained when sheets of ordinary drawn glass are united together with a layer of strengthening material interposed therebetween.

Inasmuch as ordinary drawn glass can be manufactured much more cheaply than ground and polished glass, my invention provides a commercially satisfactory laminated glass which can successfully replace laminated sheets formed of two ground and polished sheets of glass. The cost of forming a sheet of drawn glass and removing the irregularities from one face thereof is, of course, considerably less than the cost of an ordinary ground and polished sheet of glass commercially referred to as plate glass.

The product which I provide is also highly desirable from the standpoint of transmission of light. It is less absorptive than a sheet of laminated glass formed of two sheets of ground and polished glass.

The product which I provide, furthermore, is highly desirable in that it can be made considerably thinner than a laminated sheet comprising two sheets of ground and polished glass. From the standpoint of cost, it would seem desirable to make the sandwich relatively thin, but with an all plate glass sandwich, the cost rapidly increases as the glass is made thinner.

It is difficult to form a very thin plate glass blank and the problem of grinding increases the thinner the glass is ground. One difficulty has been that the glass sometimes becomes wedge-shaped or does not have the two sides perfectly plane so that it is very difficult to grind the plate glass to the desired thinness. It is desirable to have the laminated product sufficiently thin that it can be substituted for the ground and polished sheets ordinarily employed in car windows and windshields. The importance of this may be appreciated when it is considered that broken windows are always being replaced in automobiles. My invention makes it possible to provide a relatively thin sandwich which can be substituted for the ordinary glass in existing installations.

Furthermore, the product which I provide is desirable from the standpoint of safety. The added thickness incident to the use of two sheets of ground and polished glass makes the glass less safe. A windshield or window made in accordance with my invention will be employed with the drawn glass sheet facing the interior of the car or the like. The quantity of glass spalled off from the sheet of drawn glass, which, of course, will be opposite that which is struck by a missile or the like, is considerably less than the amount which would be spalled off the inner sheet of glass in the event that two sheets of ground and polished plate glass were used.

Ordinary drawn sheets of glass, such as single strength window glass, are appreciably thinner than ground and polished glass, and in view of the safety factor above pointed out, I preferably use a sheet of drawn glass which is thinner than the sheet of ground and polished glass. It will be understood, however, that the sheet of drawn glass may be of substantially the same thickness as the ground and polished sheet and remain within the scope of my invention. As stated, however, I prefer in carrying out my invention to use a sheet of drawn glass which is appreciably thinner than the sheet of ground and polished glass.

In the accompanying drawing, I have shown for purposes of illustration only, several embodiments of my invention.

In the drawing—

Figure 1:
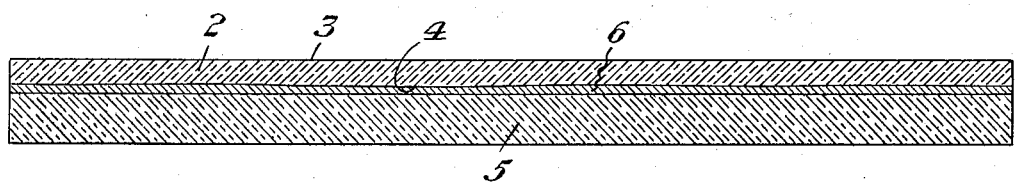
Figure 1 is a sectional view of a sheet of laminated glass embodying my invention, the sheet of drawn glass being considerably thinner than the sheet of ground and polished glass.
Figure 2:
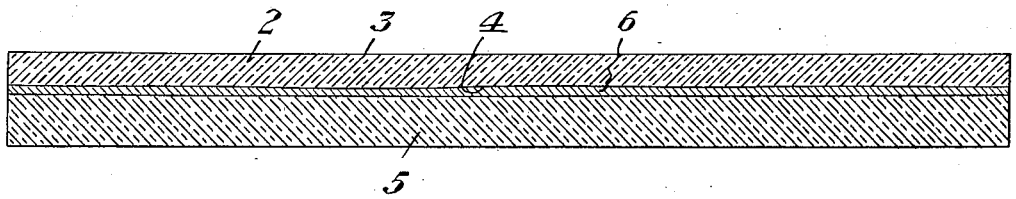
Figure 2 is a sectional view showing a further embodiment of my invention in which the sheet of drawn glass is thicker than that shown in Figure 1.

In the drawing, 2 designates a sheet of drawn glass having its outer surface 3 ground and polished and its inner surface 4 fire polished. This sheet 2 is united with a sheet of ground and polished glass 5 by means of a transparent layer of strengthening material 6. As shown in the drawing, the sheet of drawn glass may be of various different thicknesses and the wavy fire polished face of the sheet of drawn glass is turned inwardly adjacent the layer of strengthening material.

The laminated plate as described may be made according to any suitable or preferred process. I prefer to use a liquid plastic as a strengthening material and to form a film of the liquid plastic on each of the glass sheets to be formed into the sandwich and to then unite the two sheets together. My invention, however, may be utilized where a liquid plastic is used or where a sheet of strengthening material, such as a sheet of cellulose material, is interposed between the two glass sheets and is united thereto by mean of suitable adhesive material. It is preferable, of course, that the strengthening material have a refractory index substantially the same as that of glass.

By combining a sheet of ground and polished glass and a sheet of drawn glass having the irregularities removed from one surface thereof, the laminated plate cannot be easily distinguished from laminated plate made from two sheets of ground and polished glass. The wave-like irregularities of the one face of the sheet of drawn glass can scarcely be detected in the laminated plate. Drawn glass being much cheaper than ground and polished glass, it will be seen that the present invention effects a very material saving in the cost of manufacturing a commercially satisfactory product.

While I have shown and described my invention, it is understood that my invention is not limited to the particular embodiments shown in the drawing, but that my invention may be otherwise embodied within the scope of the following claims.

I claim:

1. As an article of manufacture, laminated glass comprising a sheet of ground and polished plate glass and a sheet of drawn glass having one face thereof ground and polished and the other face thereof fire polished, said sheets being cemented together.

2. As an article of manufacture, laminated glass comprising a sheet of ground and polished plate glass and a sheet of drawn glass having one face thereof ground and polished and the other face thereof fire polished, the sheet of drawn glass being thinner than the sheet of ground and polished glass, said sheets being cemented together.

3. As an article of manufacture, laminated glass comprising a sheet of ground and polished plate glass and a sheet of drawn glass having one face thereof ground and polished and the other face thereof fire polished, said sheets being cemented together, the fire polished face of said sheet of drawn glass being turned inwardly.

4. As an article of manufacture, laminated glass comprising a sheet of ground and polished plate glass and a sheet of drawn glass having one face thereof ground and polished and the other face thereof fire polished, said sheets being cemented together, the fire polished face of said sheet of drawn glass being turned inwardly, and said sheet of drawn glass being thinner than the sheet of ground and polished glass.

5. As an article of manufacture, laminated glass comprising a sheet of ground and polished plate glass and a sheet of drawn glass having the irregularities on one face thereof removed and the other face thereof fire polished, said sheets being cemented together.

6. As an article of manufacture, laminated glass comprising a sheet of ground and polished plate glass and a relatively thinner sheet of drawn glass having the irregularities on one face thereof removed and the other face thereof fire polished, said sheets being cemented together.

WILLIAM L. MONRO.